(12) United States Patent
Arnold

(10) Patent No.: US 9,022,465 B2
(45) Date of Patent: May 5, 2015

(54) CHILD SEAT ACCESSORY TO CATCH FALLEN ITEMS

(71) Applicant: Brittany Ursula Arnold, Rancho Santa Margarita, CA (US)

(72) Inventor: Brittany Ursula Arnold, Rancho Santa Margarita, CA (US)

( * ) Notice: Subject to any disclaimer, the term of this patent is extended or adjusted under 35 U.S.C. 154(b) by 0 days.

(21) Appl. No.: 14/035,180

(22) Filed: Sep. 24, 2013

(65) Prior Publication Data

US 2015/0084385 A1    Mar. 26, 2015

(51) Int. Cl.
*A47D 15/00* (2006.01)
*B60N 2/28* (2006.01)

(52) U.S. Cl.
CPC . *A47D 15/00* (2013.01); *B60N 2/28* (2013.01)

(58) Field of Classification Search
USPC .......... 297/182, 188.06, 188.2, 250.1, 256.16
See application file for complete search history.

(56) References Cited

U.S. PATENT DOCUMENTS

| 1,741,838 | A  | * | 12/1929 | Gilbert ............................. 5/484 |
| 2,254,332 | A  | * | 9/1941  | Tibbetts ..................... 297/250.1 |
| 2,641,773 | A  | * | 6/1953  | Kramer ............................... 5/94 |
| 2,688,998 | A  | * | 9/1954  | Erickson et al. ........... 297/219.1 |
| 5,549,353 | A  | * | 8/1996  | Gaudet et al. ................. 297/182 |
| 6,276,752 | B1 | * | 8/2001  | Conte ........................... 297/182 |
| 6,702,379 | B2 | * | 3/2004  | Kain ........................... 297/250.1 |
| 6,796,606 | B2 | * | 9/2004  | Marshall ....................... 297/182 |
| 7,261,375 | B2 | * | 8/2007  | Godshaw et al. ......... 297/228.12 |
| 7,677,662 | B2 | * | 3/2010  | Thompson .................... 297/223 |
| 7,681,292 | B2 | * | 3/2010  | McConnell et al. .......... 297/182 |

* cited by examiner

*Primary Examiner* — Peter Brown

(57) ABSTRACT

A device is provided for use below a child's seat to collect solid and liquid items dropped by a child in the seat when in use, where the device forms a pad or platform with a top layer of substantially fluid-resistant material, a border rim configured as a raised surface around a portion of the periphery of the pad to provide a barrier against the runoff of any collected fluids or the roll off of any collected items, and where the device also includes a connector for securing a cantilevered portion of the platform to a structure in front of the child's seat.

3 Claims, 3 Drawing Sheets

CHILD SEAT ACCESSORY TO CATCH FALLEN ITEMS

BACKGROUND

The embodiments herein relate generally to an accessory for a child seat for cathing items dropped by a child in the seat. As any parent can appreciate, any item in the hands of a child is soon to be left behind, often on the floor surrounding the seat in which they reside in when holding the item. It is problematic not only because of the inconvenience of having to retrieve the dropped item for the child, but the mess that many items cause when dropped, such as food, drink or otherwise fragile items. For smooth surfaces, such as linoleum or tiled kitchen floors, the mess is inconvenient, but usually not a chronic issue. For automobiles, where the child seat is a car seat, dropped food items and drinks often causes stains and damage to the surrounding area. Amazingly, despite countless ages of the existence of the problem, few solutions have been offerred that are fairly easy, transportable, and effective. Thus, a need remains for an improved system and method of collecting items dropped by children in child seats and preventing such dropped items from causing damage or needless messes.

SUMMARY

Embodiments of a device suitable for use below a child's seat are provided that are configured to be removably secured under the child's seat for collecting any items dropped by a child in the seat when in use. With some embodiments, the device comprises a surface substantially resistant to fluids so that fluids dropped by the child may also be collected so that both solid, soft and/or liquid items are precluded from falling to the floor below the child's seat and may be gathered for disposal by the child's caretaker.

In some cases, the device comprises a flexible but sturdy pad or platform that, in some cases, has a generally quadrilateral shape. The pad or platform may comprise a plurality of layers of material, including at least one fluid resistant layer for precluding the penetration of fluids through the pad, and where the fluid resistant layer is positioned above the one or more other layers. Preferably, embodiments of the present invention comprise a semi-rigid framework secured to the pad on at least three sides of the pad to permit a user to flex the pad into one of a variety of configurations to adapt to the environment in which the child's seat resides while providing sufficient leg room for the child residing in the seat during use. Such frameworks may comprise a plastic (as opposed to elastic) material within the framework that remains stably in the configuration set by the user, where the framework further comprises a raised portion relative to the pad to provide a barrier against the runoff of any collected fluids or the roll off of any collected items. It is contemplated that at least some embodiments, the framework is such that that the pad or platform cannot support the cantilevered end without a secondary support. In such cases, some embodiments include at least one connector for permitting engagement with means for supporting the cantilevered end of the pad to a secure structure positioned forward of the child's seat to enhance the stability of the device during use.

In some embodiments, the device may be configured for use in association with a child's car seat where the one side of the pad not secured to the framework may be slid into position below the car seat toward the back of the vehicle's seat upon which the child's car seat is positioned so that the device resides between the base of the child's car seat and the vehicle seat. In such examples, the means for supporting one end of the pad is positioned on the opposite end of the pad from the said one side of the pad secured under the child's car seat, and the means for supporting one end of the pad is secured to the forward vehicle seat in front of the child's car seat. In some embodiments, where desired, the framework may be covered by cushioned material to soften the impact of the child with the pad when being placed into or removed from the child's seat.

BRIEF DESCRIPTION OF THE FIGURES

The detailed description of some embodiments of the invention will be made below with reference to the accompanying figures, wherein like numerals represent corresponding parts of the figures.

DETAILED DESCRIPTION OF CERTAIN EMBODIMENTS

Child seats come in numerous forms, each designed to hold a child securely, whether in the form of a high-chair, a stroller, a car seat, or other forms. In any case, a child seated in such a seat is likely to drop items such as toys, food and/or drink. Embodiments of the invention herein are configured to conform to one or more styles of child seats in collecting dropped items in a manner that does not unduly damage the inventive embodiments and/or the floor beneath and/or surrounding the child seat.

Figure 1:
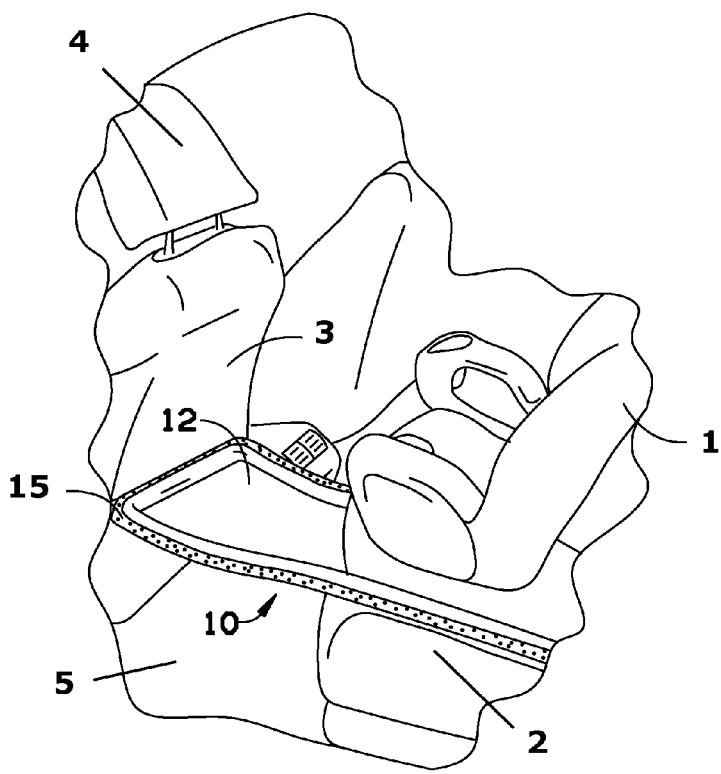
FIG. 1 shows a schematic perspective view of one embodiment of the present invention as applied to a child seat adapted for use in a passenger vehicle.
Figure 2:
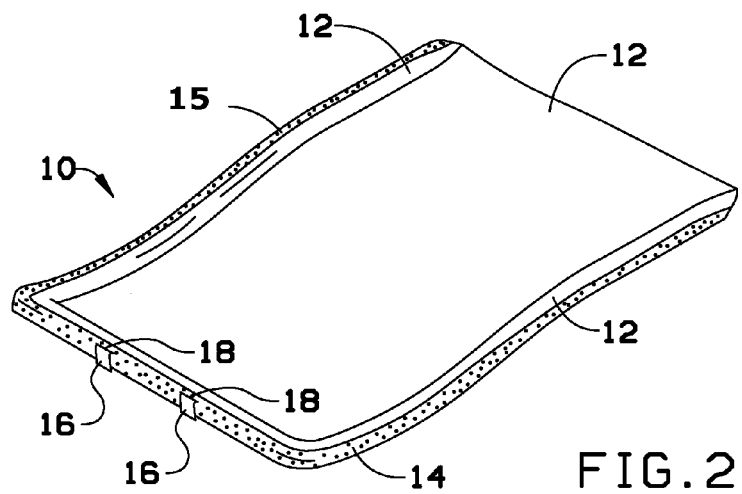
FIG. 2 shows a schematic perspective view of the embodiment of FIG. 1.

By way of example, and referring to FIGS. 1 and 2, one embodiment of the present system comprises a system 10 adapted for use with a car seat 1 secured to the passenger seat 2 of a vehicle behind the back of another passenger seat 3 immediately in front of the car seat 1. The forward passenger seat 3 has a headrest 4 and defines a floor space 5 between the forward seat 3 and the rearward passenger seat 2 upon which the child seat 1 rests. In one example, such as the one shown, the system 10 comprises a layer of water-resistant material 12, such as vinyl, placed above a layer of fabric 14, where the fabric may be natural or synthetic woven or sheeted material of any type suitable for the function of serving to provide a pliable and soft underbelly to the system. If desired, additional layers of the same or different material may be placed in between those two layers. The two or more layers form essentially a pad or platform for catching dropped items.

As shown in FIG. 1, in one embodiment, the system 10 comprises a generally four-sided quadrilateral shape, where the border rim may be provided around three of the four sides. The fourth side is left without a rim to facilitate sliding under the child seat 1 between the child seat 1 and the passenger seat 2. Other shapes and configurations are contemplated, not just a quadrilateral, particularly given that embodiments of the present invention have application to various forms of child seats in different locations and situations.

Figure 3:
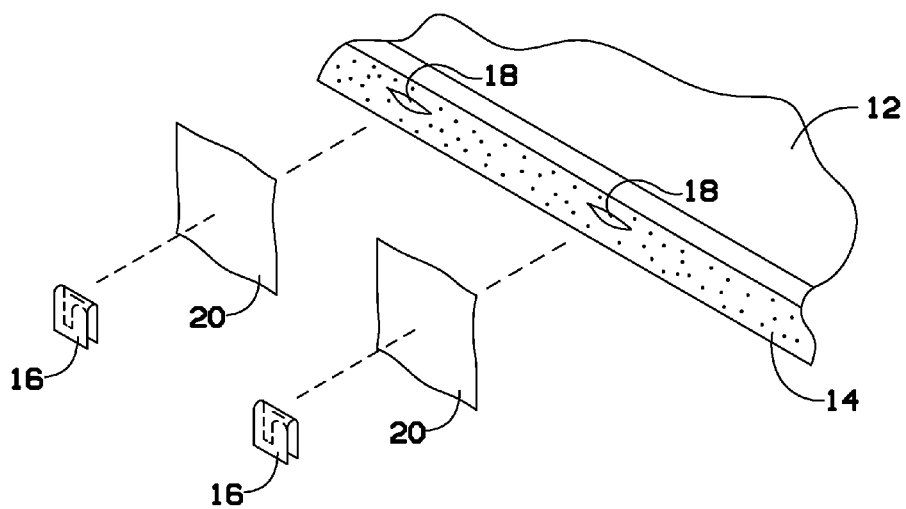
FIG. 3 shows a schematic perspective view of one feature of the embodiment of FIG. 1.
Figure 4:
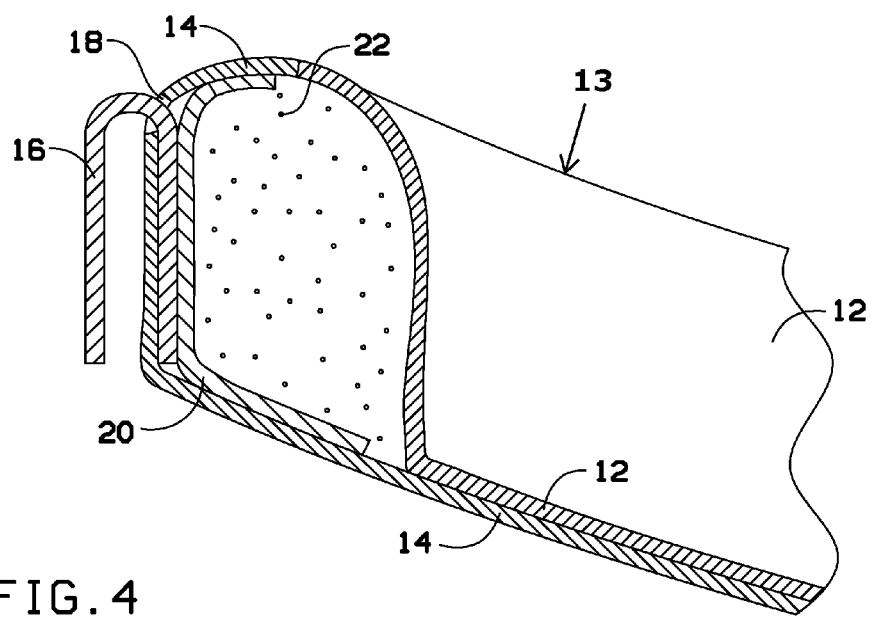
FIG. 4 shows a schematic perspective view of one feature of the embodiment of FIG. 1.

In some embodiments, the two layers are preferably joined together to form a border rim 15 with a dimension greater than the thickness of the platform created by the multiple layers 12, 14, where the upper portion of the rim is raised above the vinyl layer 12 to reduce the likelihood of items rolling off (or fluids spilling off) the system platform to the floor below. Referring also to FIGS. 3 and 4, the border may be made in any shape or configuration, but in one embodiment comprises a junction (seam) between the water-proof layer 12 and the fabric layer 14, a semi-rigid liner 20 within at least a part of the rim 15, and material filling 22, which can one or more of numerous cushiony materials.

In some embodiments, the border rim 15 may serve as a framework to define a certain curvilinear shape to the platform of the system 10, where the platform created by the multiple layers has a first tier and dips or curves to a second tier. The platform may be entirely flat if so desired. The multi-tier configuration permits more leg room for the child in the child seat. Where the border rim 15 serves as a framework to define the configuration of the system platform, the semi-rigid liner 20 may function to provide shape stability to the system 10, and may comprise material that is elastic and/or plastic such that it may be bendable into varying configurations or made set to a specific fixed configuration. The filling 22 provides cushion to avoid hard edges for the child to bang into when getting into and out of the child seat.

Referring back to FIG. 1, some embodiments are designed to rely less upon a framework and more upon separate support from a structure that exists in front of the child seat. In the case of a car seat, the structure in front may be the driver or passenger seat in front of the car seat. In such an arrangement, embodiments of the present invention may comprise one or more clips 16 that are configured to be stably secured at one end (the cantilevered end) of the system 10 within clip slots 18. The clips are further configured to be stably secured at another end to the structure in front of the car seat, as shown in FIGS. 2-4. In some embodiments, the clip is a generally U-shaped component that can be slid into opening 18 of the border rim 15 of the system 10 and also slid into an opening or ledge in the structure in front of the car seat, such as the forward seat 3 of the vehicle. For example, the backs of some forward seats 3 include a magazine/book holder (not shown). In such cases, the clip(s) could be slipped into the holder to secure the system 10 in place to prevent the cantilevered end of the system from collapsing toward the floor.

Figure 5:
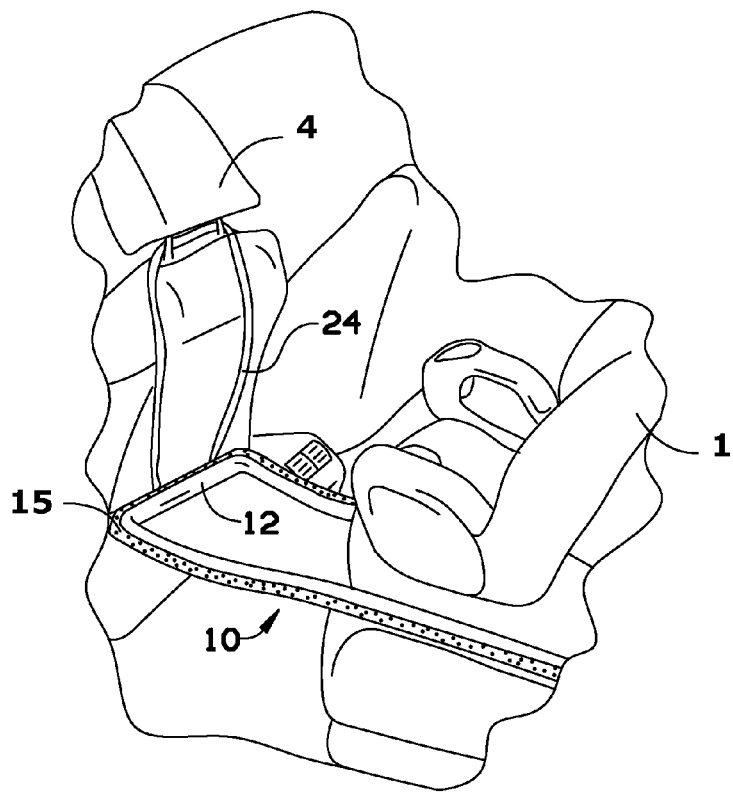
FIG. 5 shows a schematic perspective view of another embodiment of the present invention as applied to a child seat adapted for use in a passenger vehicle.
Figure 6:
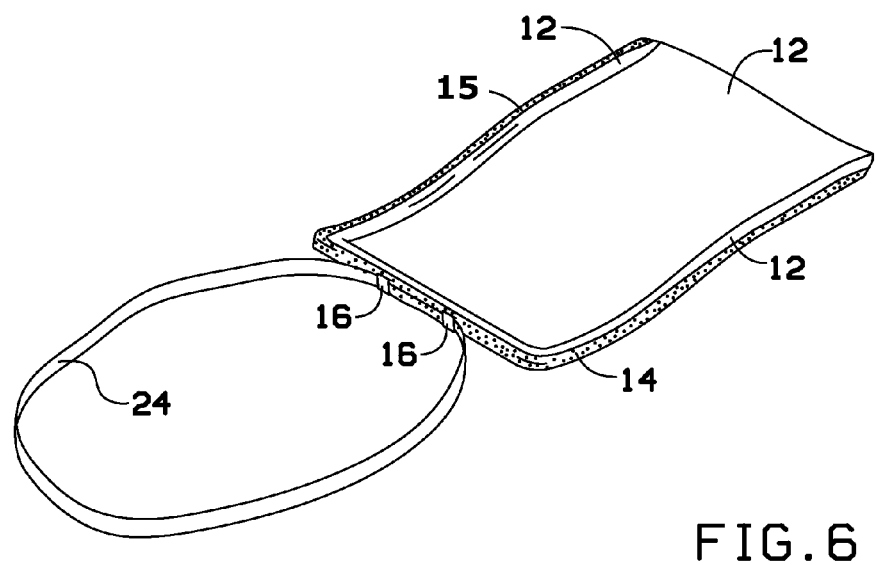
FIG. 6 shows a schematic perspective view of the embodiment of FIG. 5.

With reference to FIGS. 5 and 6, an alternative embodiment may comprise a strap 24 secured to the border rim 15 either by attaching the strap directly to the clips 16 or directly to the border rim without the need for clips. In either case, the strap is configured to be wrapped around a support on the structure in front of the child seat, such as the head rest 4 of the forward seat 3. Other configurations and arrangements for components to support the cantilevered end of embodiments of the present inventions are also contemplated, and not limited to clips and/or straps.

In one very specific example of an embodiment of the present invention, a method of making a child seat accessory to catch fallen items may comprise the following steps: first, cut out one rectangle of vinyl, one rectangle of desired fabric, one strip of vinyl, one strip of fabric, two small 4 inch squares of fabric, one long and skinny strip of fabric used as an alternative strap to hold up the product around the headrest and through the clips; and second, take the one strip of vinyl and the one strip of fabric, face the two pieces facing each other and sew together one long side of the fabrics together. Sew a straight line first and then use a serger sewing machine to cut off the excess material to hold together the edges with the zig-zag seam that is created. Third, make one buttonhole on the fabric side a few inches from the left of the middle of the strip of fabric, then make a second buttonhole a few inches from the right of the middle of the strip of fabric. The buttonholes are located preferably less than an inch from the seam on the fabric side. Cut open the button holes after sewing. Fourth, place the hook in one buttonhole with the front of the hook coming out of the buttonhole and showing on the front of the fabric side. Take one approximately 4-inch square of the fabric previously cut out and place it behind the backside of the clip. In order to sew the clip into place you must use a straight stitch with the sewing machine to go around the clip in a square. While sewing the square around the clip make sure that the 4 inch square and the top of the fabric are the only pieces being sewn together. The vinyl part of the long strip should not be sewn. Complete step four to both button holes. The clips should be sewn in with the opening of the clip facing the end of the fabric. Nothing should be sewn onto the vinyl side. Take the long strip of fabric and vinyl and fold it lengths way with the front of the fabric and vinyl showing. Use pins to hold the non-sewn edges together along the entire edge of the strip except the sides of the strip. Fifth, take one rectangle of vinyl and lay it on the table vertical, facing the front of the fabric up. Then place the long strip of vinyl and fabric from step two and three and place it on top of the vinyl with the vinyl side facing the vinyl rectangle and the un-sewn edge with the pins facing the edge of the vinyl rectangle with the middle point of the strip matching the middle point of the rectangle on the top edge. Then place one rectangle of fabric directly over the vinyl rectangle piece in the vertical position with the back of the fabric facing you. Use pins to attach all of the pieces edges together. Sixth, sew a straight stitch along the edges of the rectangles that hold the long strip of vinyl and fabric together, three edges. Then go back with a serger sewing machine. Seventh, flip inside out and stuff the edges with poly-fill. Eighth, sew close the edges. Ninth, tuck in the last side and sew it closed with a top stitch. Tenth, fold the long and skinny strip of fabric lengthwise with the back of the fabric on the outside. Use a straight stitch and then a serger to sew one seam on the length of the strip. Flip inside out and then sew together the two edges to create a circle. In such an application, preferred materials include vinyl, plastic clips, fabric and polyester filling, although other materials may of course be used instead. The filling can be replaced by other materials to improve the product if needed. The plastic clips could be configured differently to accommodate different child seat locations.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A device suitable for use below a child's seat and configured to be removably secured under the child's seat for collecting any items dropped by a child in the seat when in use, the device further configured to be substantially resistant to fluids so that fluids dropped by the child may also be collected so that both items and fluids are precluded from falling to the floor below the child's seat and may be gathered for disposal by the child's caretaker, the device comprising:
   a flexible but sturdy pad having a generally quadrilateral shape, the pad comprising a plurality of layers of material, including at least one fluid resistant layer for precluding the penetration of fluids through the pad, where the fluid resistant layer is positioned above the one or more other layers;
   a semi-rigid framework secured to the pad on at least three sides of the pad to permit a user to flex the pad into one of a variety of configurations to adapt to the environment in which the child's seat resides while providing sufficient leg room for the child residing in the seat during use, the framework comprising a plastic material within the framework that remains in the configuration set by the user, the framework further comprising a raised portion relative to the pad to provide a barrier against the runoff of any collected fluids or the roll off of any collected items, the framework also comprising at least one connector for permitting engagement with means for supporting one end of the pad; and a means for supporting one end of the pad to a secure surface positioned forward of the child's seat to enhance the stability of the device during use.

2. The device of claim 1, where the device is configured for use in association with a child's car seat where the one side of the pad not secured to the framework may be slid into position below the car seat toward the back of the vehicle's seat upon which the child's car seat is positioned so that the device resides between the base of the child's car seat and the vehicle seat, and wherein the means for supporting one end of the pad is positioned on the opposite end of the pad from the said one side of the pad secured under the child's car seat, the means for supporting one end of the pad configured to be secured to the forward vehicle seat in front of the child's car seat.

3. The device of claim 1, wherein the framework is covered by cushioned material to soften the impact of the child with the pad when being placed into or removed from the child's seat.

\* \* \* \* \*